(12) United States Patent
Angha

(10) Patent No.: US 6,865,563 B1
(45) Date of Patent: Mar. 8, 2005

(54) NEURON NETWORK MODELING

(75) Inventor: Nader Angha, Franksville, WI (US)

(73) Assignee: Maktab Tarighe Oveyssi Shah Maghsoudi, Burbank, CA (US)

( * ) Notice: Subject to any disclaimer, the term of this patent is extended or adjusted under 35 U.S.C. 154(b) by 316 days.

(21) Appl. No.: 10/141,069

(22) Filed: May 9, 2002

Related U.S. Application Data

(60) Provisional application No. 60/289,550, filed on May 9, 2001.

(51) Int. Cl.$^7$ .......................... G06F 1/00; G06F 15/18
(52) U.S. Cl. .................................. 706/15; 706/33
(58) Field of Search ..................... 706/15, 33

(56) References Cited

U.S. PATENT DOCUMENTS 6,070,140 A * 5/2000 Tran ........................ 704/275

* cited by examiner

Primary Examiner—George B. Davis

(57) ABSTRACT

The Neuron network modeling compares neuron behavior in terms of electrical properties to predict the propagation of capacitative, or inductive current/potential along a nerve fiber. Membrane ion channels act as capacitor-inductor circuits, similar to a radio receiver and transmitter. Therefore, a single circuit, including the membrane capacitor, the ion channel, inductors and resistors, nerve fibers, neurons, and the whole CNS may be modeled as radio receivers and transmitters A speech process for the hearing impaired is disclosed as one example embodiment.

20 Claims, 8 Drawing Sheets

The equivalent circuit for the parallel circuit. The parameters L, R, and $\varepsilon_\lambda$ are defined as follows:

$$\frac{1}{L} = \frac{1}{L_K} + \frac{1}{L_{Na}} + \frac{1}{L_L},$$

$$\frac{R}{L} = \frac{R_K}{L_K} = \frac{R_{Na}}{L_{Na}} = \frac{R_L}{L_L}, \text{ and}$$

$$\frac{\varepsilon_\lambda}{L} = L\left[\frac{\varepsilon_K}{L_K} - \frac{\varepsilon_{Na}}{L_{Na}} + \frac{\varepsilon_L}{L_L}\right]$$

FIG. 2B
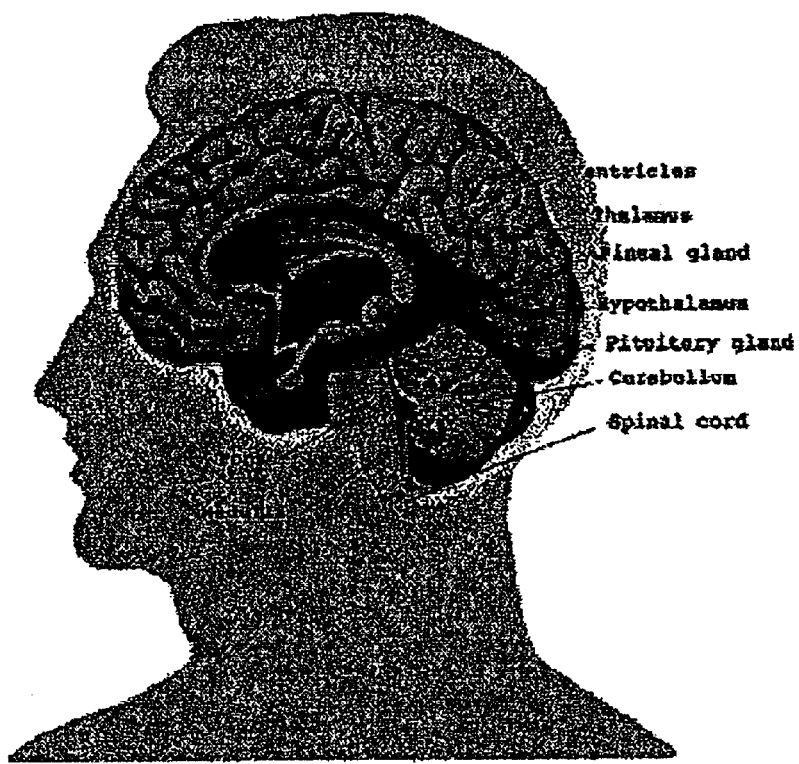
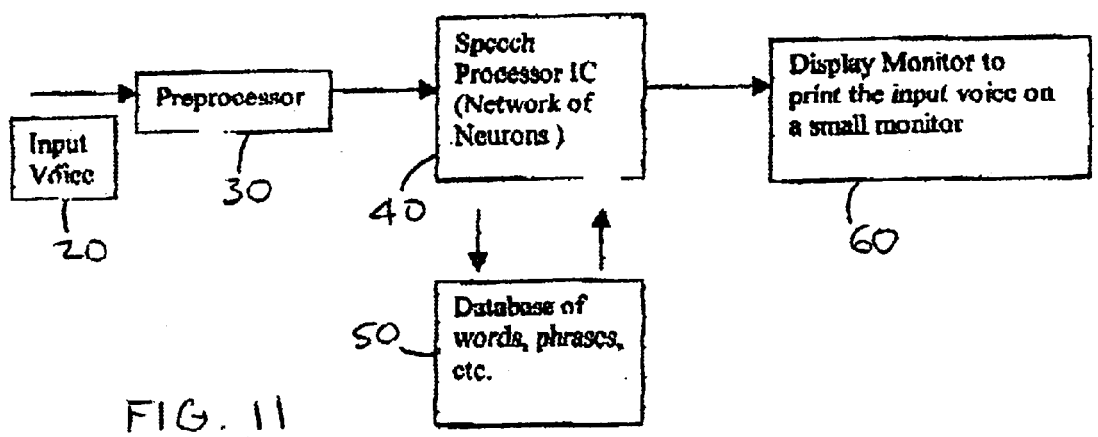
FIG. 11

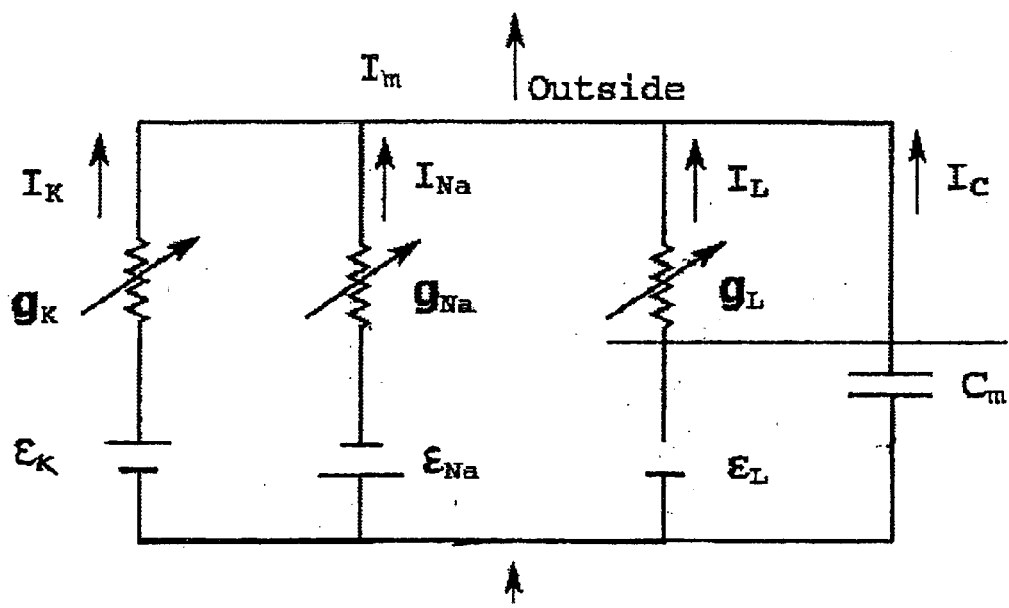
FIG. 4
FIG. 5
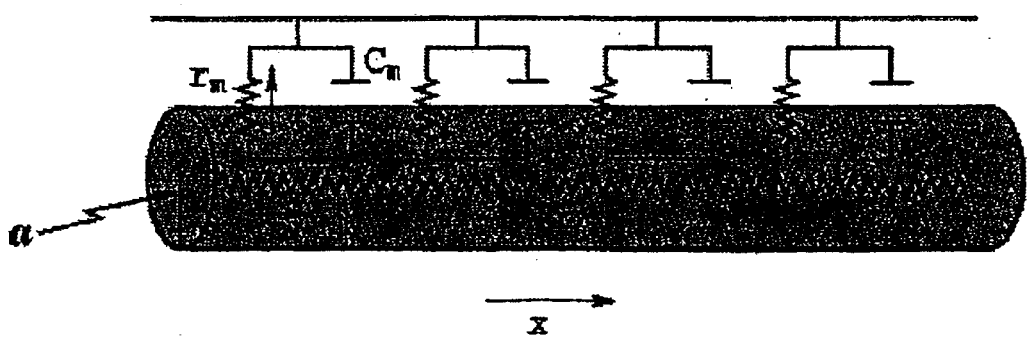

The equivalent circuit for the parallel circuit. The parameters $L$, $R$, and $\varepsilon_\lambda$ are defined as follows:

$$\frac{1}{L} = \frac{1}{L_K} + \frac{1}{L_{Na}} + \frac{1}{L_L},$$

$$\frac{R}{L} = \frac{R_K}{L_K} = \frac{R_{Na}}{L_{Na}} = \frac{R_L}{L_L}, \text{ and}$$

$$\frac{\varepsilon_\lambda}{L} = L\left[\frac{\varepsilon_K}{L_K} - \frac{\varepsilon_{Na}}{L_{Na}} + \frac{\varepsilon_L}{L_L}\right]$$

NEURON NETWORK MODELING

This application claims the benefit of Provisional Application Ser. No. 60/289,550 filed May 9, 2001.

FIELD OF THE INVENTION

The present invention discloses a novel method for Neuron network modeling, to aid in the further development of artificial intelligence (AI), networks, networking, human communication, and a cure of neuropsychological and neuron related disorders.

BACKGROUND OF THE INVENTION

The Central Nervous System (CNS) is composed of the brain and the spinal cord. The CNS is utilized to scan, evaluate and process, and respond to the information we receive primarily through our sense organs.

The spinal cord is primarily used for motor functions of skin, joints, muscles, and ligaments and conveying motor commands for movements. A spinal nerve contains afferent fibers which enter the spinal cord and are specifically used to carry the information to the spinal cord and efferent fibers which exit the spinal cord and are specifically used to carry the information from the spinal cord to the organs.

The brainstem contains the cell bodies—the nuclei of the nerve cells of the cerebellum. It is composed of three parts: first medulla is the lower part which connects the brainstem to the spinal cord. The second (above medulla) pons (or the bridge) whose nerve cells connect to the cerebral cortex and to the cerebellum. The third part of the brainstem is the midbrain which is situated over the pons.

The cerebellum is the control center for the motor functions. It involves coordination of the range and force of movements and posture.

The diencephalon contains the thalamus and hypothalamus. The thalamus is an important switchboard for all afferent sensory input except for the sense of smell. The hypothalamus resides under the thalamus and is the center for autonomic activities.

Above the hypothalamus sits a reservoir of nerve centers called the limbic system where both inborn and acquired behavior are regulated.

The cerebral hemispheres are divided by sucli or grooves into four parts: the frontal, parietal, temporal, and occipital lobes. The two hemispheres are connected to each other by the corpus cullosum. Each of the hemispheres is the center for specialized types of functions.

The frontal lobe is primarily concerned with complex motor functions including movement. The prefrontal fibers reside in the forward portion of the frontal lobe, and are concerned with control of actions to conform to social moves. The primary sensory cortex is located in the parietal lobe. The temporal lobe is concerned with one's hearing, memory and sense of time, and plays a role in human emotional experiences. The occipital lobe is the specialized center for visual experiences.

The left hemisphere of the brain works in an interpretive way. It operates analytically, breaking the received data into their most elementary constituents, then studying each element one by one. This leads to exaggerations and deviations from the realistic path.

The right hemisphere of the brain is concerned with perceptual aspects of stimuli. This results in a more literal picture than obtained from the left brain.

Some psychologists believe that every person has two types of minds; the objective mind and the subjective mind.

Neurophysiologal observations indicate that the functions of the brain are intimately related to the number of communicating neurons and their interconnections.

Each neuron is comprised of a nucleus, a long fiber called the axon, and a varying number of branching fibers called dendrites, which extend out to other neurons.

There are about 10 synapses in the human brain. A single neuron can make numerous contacts.

Every new thought process is handled by a new set of synaptic connections. Memory itself is a set of synaptic connections engraved in the network of neurons.

A nerve cell responds to a stimulus by changing the electrical properties of its cell membrane. In its unexcited state, an electric potential difference exists across the membrane of a living cell. Stimuli increases the positive ion concentration of the outer membrane, to increase the magnitude of the potential difference, called depolarization.

SUMMARY OF THE INVENTION

The present invention delivers neuron behavior in terms of electrical properties pertaining to the propagation of capacitative and inductive current/potential along a nerve fiber. The two membranes act as capacitors and the ion channels act as an inductor in a circuit, similar to a radio receiver and transmitter. Therefore, a single circuit (including the membrane capacitor, the ion channel, inductors and the neurons, nerve fibers, neurons, and the whole CNS) may be modeled as interfaced radio receivers and transmitters.

One object of this invention is to provide Neuron network modeling, to aid in the further development of artificial intelligence (AI).

Another object of this invention is to provide neuron network modeling to dramatically improve the performance of networks, networking, and human communication.

Yet another object of this invention is to provide neuron network modeling to aid in the development of a cure for neuropsychological and neuron related disorders.

BRIEF DESCRIPTION OF THE DRAWINGS

FIG. 2B is a more detailed view of the brain.

FIG. 4 is a schematic view of a parallel conductance model for the squid axon.

FIG. 5 is a schematic view showing parallel circuits of FIG. 4, taken along the axon.

FIG. 11 is a block diagram of a speech processor for the hearing impaired, utilizing the neuron network modeling disclosed herein.

DESCRIPTION OF THE PREFERRED EMBODIMENTS

Artificial neural networks with the same capabilities of human neurons for training and learning, were first introduced about half a decade ago. Since then, numerous models based on various mathematical algorithms have been proposed. Many different applications of Neural Networks, such as human like performance in the areas of speech and image recognition have been developed.

The electronic implementation of a neuron and a network of neurons provide a class of electronic circuits based on different mathematical models and algorithms. Traditionally, there are two main properties for these systems. First, the model of a neuron; and second a model of a network of connections between neurons. Most prior research has related to the second issue. These prior models relate to capacitive and resistive elements.

This invention relates to the use of inductive elements, while utilizing discrete capacitances, resistances, and inductances together with proper amplication. Analog VLSI technology is also implemented using this technology.

In order to better understand this technology, applicant will first discuss in detail the process of neuron activity in the brain.

Figure 1:
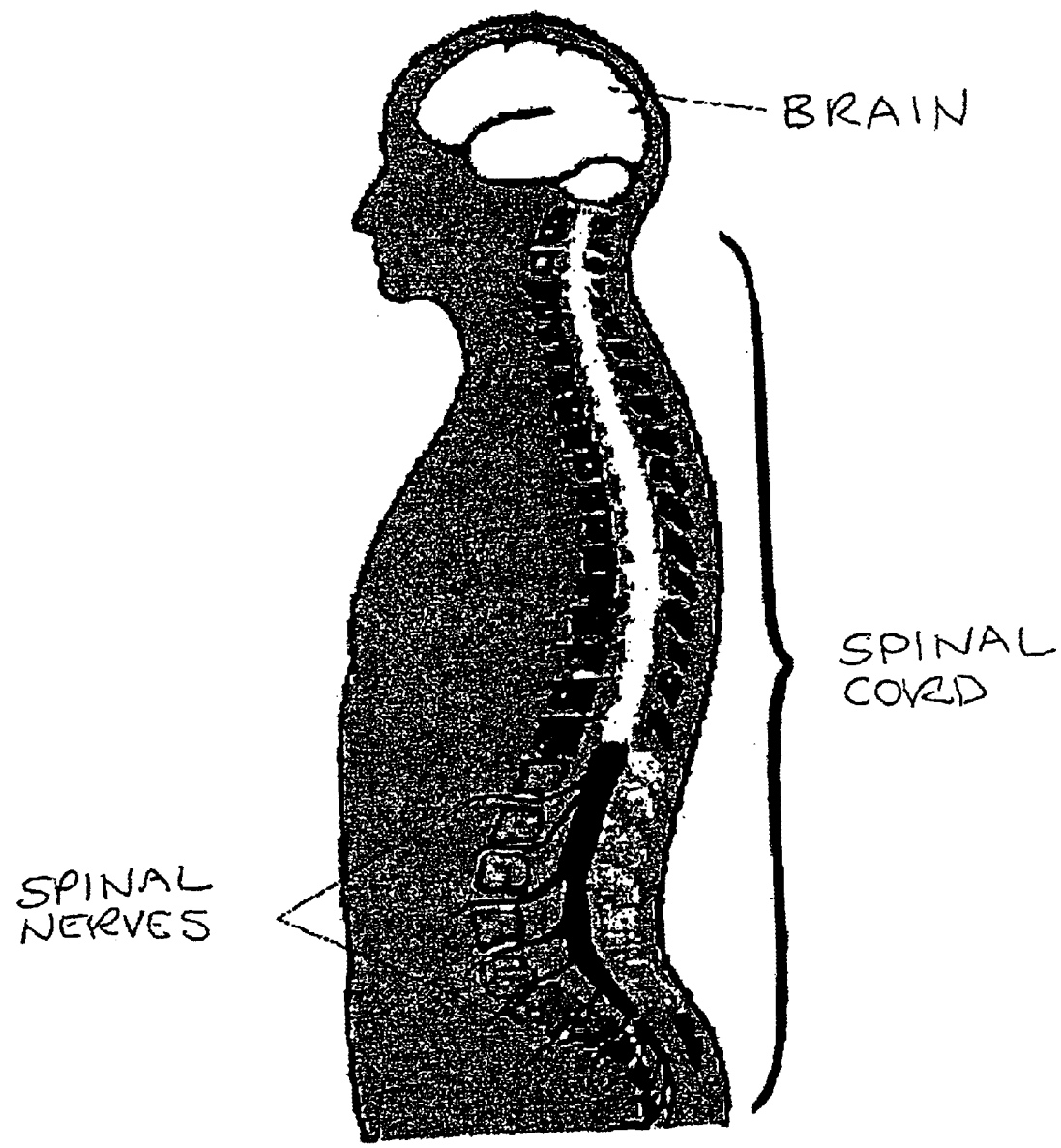
FIG. 1 is a schematic view of the central nervous system comprising the brain and the spinal cord. The spinal nerves extend to the end of the vertebral canals as well as to the outside of the canal at the level of the corresponding vertebra.

The Central Nervous System (CNS) is composed of the brain and the spinal cord (FIGS. 1 and 2). The CNS is utilized to scan, evaluate and process, and respond to the information we receive primarily through our sense organs. Each region of the CNS is used for a certain function. These regions are as follows: (Agamemnon Despapopoulos and Stefan Silbernagl, Color Atlas of Physiology, Thieme Medical-Publishers, Inc., New York 1991).

1. The spinal cord is primarily used for motor functions of skin, joints, muscles, and ligaments and conveying motor commands for movements. As FIG. 1 shows, the spinal cord is shorter than the vertebral column. Nevertheless, the spinal nerves extend to the end of the vertebral canal. Also these nerves extend to the outside of the canal at their level of corresponding vertebra. A spinal nerve contains afferent fibers which enter the spinal cord and are specifically used to carry the information to the spinal cord and efferent fibers which exit the spinal cord and are specifically used to carry the information from the spinal cord to the organs. In general, the neurons themselves reside in the CNS and only their axons, dendrites, and synapses spread throughout the body. If as a result of an injury the spinal cord is cut, then those parts of the body below the damaged point are paralyzed, i.e., lose their sensation and voluntary movement (Agamemnon et al., 1991).

2. The brainstem (FIG. 2a and 2b) which contains the cell bodies—the nuclei of the nerve cells of the cerebellum. It is composed of three parts: first medulla is the lower part which connects the brainstem to the spinal cord. It is approximately one inch long and is used in functions such as breathing, talking, singing, swallowing, vomiting, and blood circulation. Second (above medulla) pons (or the bridge) whose nerve cells connect to the cerebral cortex and to the cerebellum. The third part of the brainstem is the midbrain which is situated over the pons. The midbrain is the smallest part of the brainstem. The function of this part is the preliminary processing and subsequent leading of the audio and visual information to their appropriate centers.

The cerebellum is the control center for the motor functions. It involves coordination of the range and force of movements and posture (Restak Richard M., The Mind, Bantam Books, New York 1988).

Figure 2A:
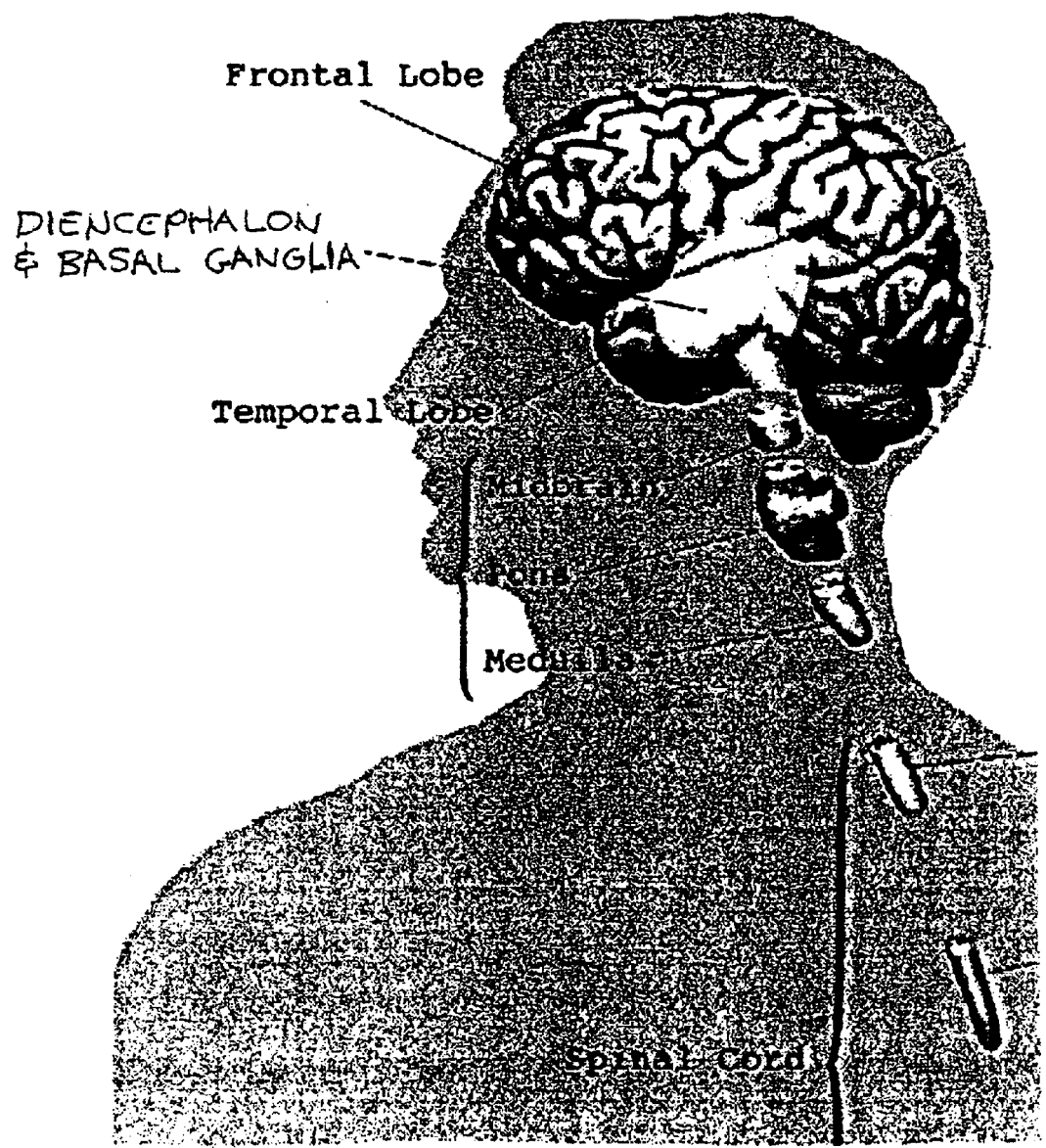
FIG. 2A is a schematic view of the spinal cord, the brainstem, and the cerebral hemispheres.

3. Next is the diencephalon which contains the thalamus and hypothalamus (FIG. 2a and 2b). The thalamus is an important switchboard for all afferent sensory input except for the sense of smell. The hypothalamus resides under the thalamus and is the center for autonomic activities. The weight balance, sexual rhythms, hunger, anger, and fatigue are among functions which are regulated and commanded through hypothalamus (Restak, 1988).

4. Above the hypothalamus sits a reservoir of nerve centers called the limbic system (FIG. 2) where both inborn and acquired behavior are regulated. It also is the site of instructive behavior, motivation, and emotion including rage, fright, aggression, hunger and sexual arousal. The limbic system is connected to the hypothalamus as well as the cortical centers of the temporal lobes. Therefore, our cognitive fantasies and observations get to our conscious awareness by means of the limbic system.

5. Finally there are the cerebral hemispheres each of which is divided by sucli or grooves into four parts: the frontal, parietal, temporal, and occipital lobes (FIG. 2a). The two hemispheres are connected to each other by the corpus cullosum. Each of the hemispheres is the center for specialized types of functions.

The frontal lobe is primarily concerned with complex motor functions including movement. The prefrontal fibers which reside in the forward portion of the frontal lobe are concerned with the control in actions to conform to social moves (Restak, 1988).

The parietal lobe is the site for the reception of all sensory information. The primary sensory cortex is located in the parietal lobe. Within the parietal lobe each part of the body is represented by an area whose size is proportional to the functional significance of the related body part.

The temporal lobe is concerned with one's hearing, memory, and sense of time. Because of its connection to the limbic system, it also plays a role in our emotional experiences.

The occipital lobe is the specialized center for visual experiences. The information from the retina of the eyes is transmitted to the occipital lobe and is transformed there. Studies have shown that the two sides of the brain function in different ways. The left hemisphere works in an interpretive way seeking the logical meaning of events (Restak, 1988; Rhodes Raphael H., Hypnosis, MJF Books, New York 1978). It operates analyticly, breaking the received data to their most elementary constituents, then, studying each element one by one. The interpretive mechanism of the left hemisphere is always at work. It always looks for order and reason, often in its own way regardless of whether or not its interpretation of "order" and "reason" is in the proper context (Restak, 1988). This leads the deductions of the left brain to exaggerations and thus deviations from the realistic path.

The right hemisphere of the brain, on the other hand, is concerned with the simple perceptual aspects of stimuli. Recent studies show that the use of the right brain results in a much more literal picture than that of the left brain. Therefore to observe and preserve holistic pictures of experiences and observations, the right brain works much better (Restak, 1988).

On the other hand, experiments have led some psychologists to believe that every person has two types of minds; the objective and the subjective mind. Whereas the subjective mind performs only inductive reasoning, the objective mind performs both inductive and deductive reasoning. Inductive reasoning occurs when a picture of constituent elements simply is composed into a holistic conclusive picture, without further analysis of the elements. In deductive reasoning, however, the constituent elements are studied and interpreted individually, assembled conceptually and logically, and a conclusion is drawn. Therefore, in deductive reasoning a variety of conclusions may be drawn as the constituent elements are assembled in several possible ways.

From the aforementioned observations of the functional mechanism of the left and right brain on one hand, and the definition of the objective and subjective minds on the other, it is reasonable to assert that the left side of the brain is primarily influenced by the objective mind and the right brain by the subjective mind.

Figure 3:
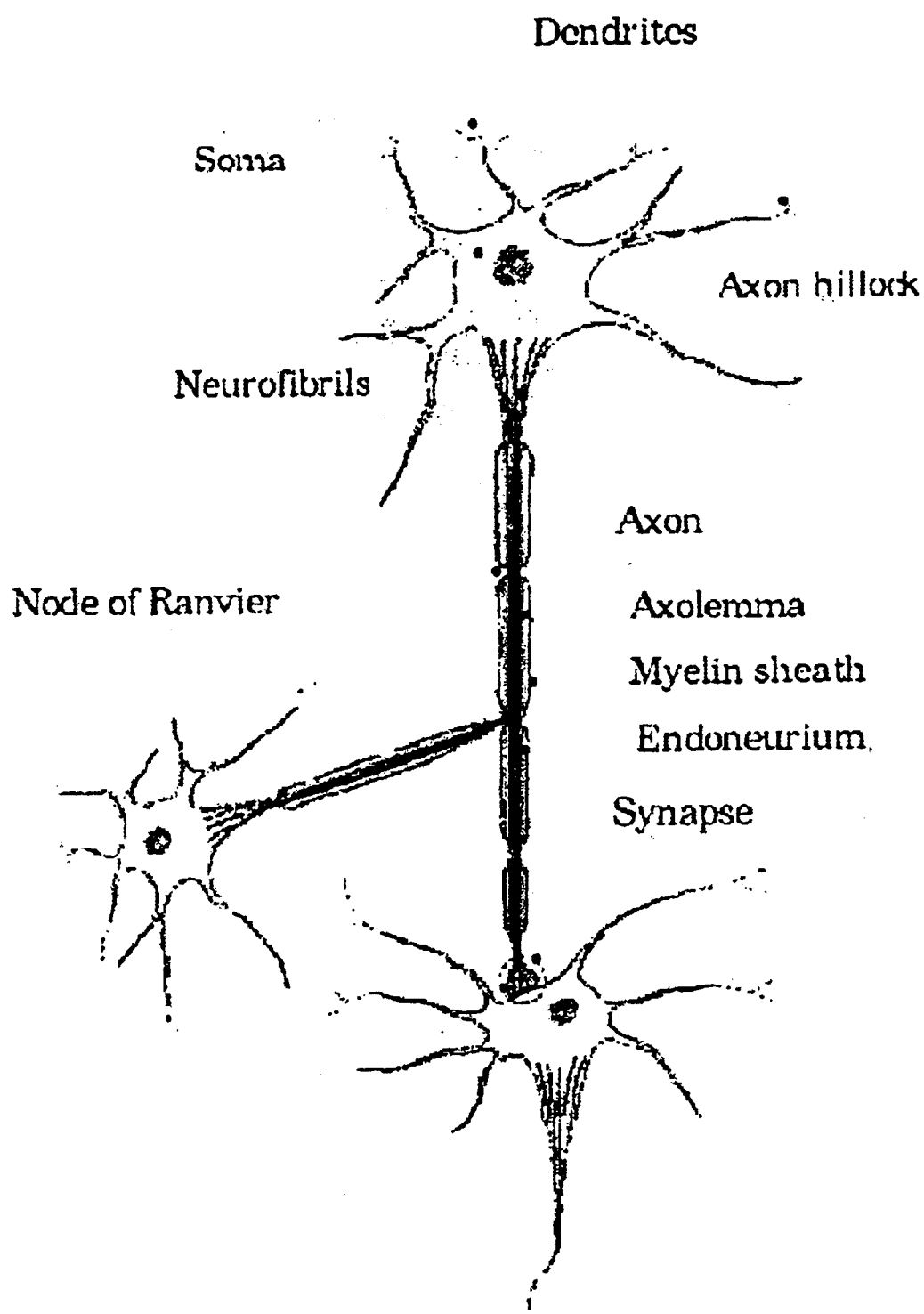
FIG. 3 is a schematic view of a neuron, showing the nucleus, the axon and the dendrites which extend out to other neurons.

Observations in Cellular Neurophysiology show that the functions of the brain are intimately related to the number of communicating neurons as well as their interconnections. A neuron is comprised of the nucleus, a long fiber called the axon, and a varying number of branching fibers called the dendrites which extend out to the other neurons (FIG. 3) (Agamemnon et al., 1991; Restak, 1988).

Interneuron information is transmitted through electrical signals flowing from the axon of one neuron to the dendrite of the second one. The contact between the two is called the synaptic contact or, simply, a synapse. The axon ending is the presynaptic membrane and the dendrite ending is the postsynaptic membrane of the synaptic contact. Although at the synapse, the membranes of the two neurons are in very close contact, there is a tiny gap, the synaptic cleft, between them. An electrical impulse is transmitted across the synaptic cleft either by the induction of an electric field (the gap junction) or by release of neurotransmitters. These ions or neurotransmitters are released from the presynaptic membrane, diffused across the synaptic cleft, and are received by postsynaptic membranes (Agamemnon et al., 1991; Jhonston Daniel and Miao-Sin Wu Samuel, Foundations of Cellular Neurophysiology, The MIT Press, Cambridge, Mass. 1997).

The specific and precise connections of neurons with certain other neurons is what is considered to be responsible for the functional mechanisms of the CNS. There are about $10^{15}$ synapses in the human brain. Whereas some of these synaptic contacts are between two neighboring neurons, there are some neurons with long axons which make synaptic contacts meters away. Also a single neuron can make numerous contacts (Restak, 1988; Jhonston et al. 1997).

Neural electrical signals, either inductive or transmitted by ions, are the heralds of the CNS. Therefore, every new thought process is handled by a new set of synaptic connections. Actually, memory itself is a set of synaptic connections engraved in the network of neurons. This paradigm paraphrases the functional mechanism of the mind utilizing the CNS; in that the synaptic contacts are the mind's emissaries for either or both perception and conveyance of the inner and outer world. Thus to discern the principles and mechanisms of neural signaling is of primary importance in our ultimate quest to grasp who we are and what we are. (Restak, 1988).

The mechanism by which a neuron responds to a stimulus and the propagation of the effect of that stimulus along the nerve fiber, is disclosed as follows: a nerve cell responds to a stimulus by changing the electrical properties of its cell membrane. In its unexcited state, an electric potential difference exists across the membrane of a living cell. This so-called resting membrane potential amounts to 50–100 mV, with the cell interior being of lower potential (Agamemnon et al., 1991).

This potential difference is due to an inequilibrium of the concentration of ions between the inner and outer parts of the cell membrane. The main ions to participate in producing the membrane potential difference are $Na^+$, $K^+$, $Cl^-$, and $Ca^{2+}$. Only the nerve and muscle cells show excitability; which means the cells respond to a stimulus by producing transient changes in the ion conductances thus the electric potential difference of their membranes.

Basically in a nerve cell, stimuli increase the positive ion concentration of the outer membrane thereby increasing the magnitude of the potential difference. This is called depolarization. When the potential difference reaches a critical value, i.e., the threshold, the $Na^+$ channels (the pathways through which the $Na^+$ ions penetrate inside the cell) open. This results in an abrupt, enormous increase in the $Na^+$ membrane conductance (or decrease in its resistance), hence a fast $Na^+$ flux into the cell.

Accordingly, the negative potential of the inside of the cell is reduced in magnitude, i.e., the potential difference approaches zero. The critical value of the potential difference at which the $Na^+$ channels are activated is called the action potential. Therefore, the effect of the stimuli on the neuron is the production of an action potential.

Apparently the action potential propagates along the neuronal fiber. It then reaches the synapses where it either stimulates the release of the neurotransmitters or induces an electric field on the postsynaptic membrane across the synaptic cleft. The propagation of the action potential across the nerve fiber does not seem to occur as it does in electrical wires. Both the large value of the longitudinal electrical resistance of the nerve fiber and the weakness of its insulation, prevent a cablelike transmission along the nerve fiber (Agamemnon et al., 1991; Jhonston et al., 1997).

What neurophysiologists believe happens, is that after the local action potential causes the local $Na^+$ channels to open, the inside of the membrane becomes, locally, more positively charged. This difference in the charge density between the neighboring sections along the fiber results in the charge moving longitudinally both in the inside and the outside of the cell membrane. This longitudinal shift of the electrons is the equivalent of the longitudinal shift of the action potential (Agamemnon et al., 1991; Jhonston et al., 1997).

However, since the electrical properties of the excitable cells are very similar to those of electrical circuits, usually in electro-physiology, the membrane is demonstrated by electrical circuits. In linear cable theory the nerve fiber is assumed to have constant electrical resistance, both longitudinal and transverse. However, first I will review the approach of the nonlinear theory which resembles the linear case and also is a more general approach. (Jhonston et al., 1997).

Hodjkin and Hoxley proposed a model of the circuitry of cell membrane (of squid axon) (Jhonston et al., 1997; J. J. B. Jack, D. Noble, and R. W. Tsien, Electric Current Flow in Excitable cells, Clarendon Press, Oxford 1975; David J. Aidely, The Physiology of Excitable Cells, Second Edition, Cambridge University Press, Cambridge Mass. 1978; A. L. Hodgjkin and A. F. Huxley, J Physiol., 117, 500–44 1952).

First, they used the parallel conductance model to describe the major ionic conductances in the squid axon (FIG. 4) (Jhonston et al., 1997). In this figure: $g_K$, $g_{Na}$, and $g_L$ are the conductances (the inverse of the electrical resistance R). The parameters $e_K$, $e_{Na}$, and $e_L$ are the potentials when the cell is at rest. The currents $I_K$, $I_{Na}$, and $I_L$ are those of $K^+$, $Na^+$, and L, the leak ions, respectively.

The conductances are assumed to be functions of both the applied electric potential and time. Having a negatively charged inner surface and a positively charged outer surface, the membrane of the cell acts like a capacitor shown by $C_m$, in the circuit. Here, $C_m$ is the membrane capacitance of a strip of the cylinder of the fiber with an area of 1 cm$^2$. From FIG. 4 it is clear that the membrane current $I_m$, is equal to the sum of all of the currents, i.e.

$$I_m = I_C + I_K + I_{Na} + I_L, \tag{1}$$

where $$I_C = \frac{dQ}{dt} = C_m \frac{dV}{dt},$$

therefore $$I_m = C_m \frac{dV}{dt} + I_K + I_{Na} + I_L. \tag{2}$$

Assuming the resistors obey Ohm's law, one can write $$I_m = C_m \frac{dV}{dt} + (V - _K)g_K + (V - _{Na})g_{Na} + (V - _L)g_L. \tag{3}$$

Hodjkin and Hoxley suggested that the K$^+$ and Na$^+$ conductances are the products of the probability of the gates being open, $Y_K(V,t)$ and $Y_{Na}(V,t)$, and maximum conductances, $\tilde{g}_K$ and $\tilde{g}_{Na}$, respectively. Here $0 \ Y_K$ and $Y_{Na}$ 1 are called the gating variables. Using the experimental data, Hodjkin and Hoxley proposed their solutions to the gating variables and thus to the voltage and time variations of conductances (Jhonston et al. 1997; Jack et al. 1975; Aidely 1978; Hodgjkin et al. 1952).

Hodjkin and Hoxley later presented their model of the propagation of the action potential along the axon. FIG. 5 shows the equivalent circuit of a cable for a part of an axon. Here $V_m(x,t)$ is the potential difference between the inside and the outside of the membrane and $c_m$ is the capacitance per unit length of the cable.

Employing Ohm's law, concluding that the longitudinal drop in the membrane potential is equal to the product of the internal resistance and current, one can write $$V_m(x,t)/x = -r_i i_i. \tag{4}$$

Here, $r_i$ is the axial resistance per unit length of the axon's cross section and $i_i$ is the internal current. Some of $i_i$ though, leaks out of the membrane through $r_m$ and $c_m$.

Therefore, $$i_i/x = -i_m \tag{5}$$

Combining these two equations $$i_m = r_i^{-1} \frac{\partial^2 v_m}{\partial x^2}. \tag{6}$$

Appendix I shows that $c_m = 2 a C_m$, $r_m = 2 a R_m$, $r_i = a^2 R_i$ with $R_i$ being the resistivity of the axon, and $i_m = 2pa I_m$. Using these relations and that $$I_m = C_m \frac{\partial V_m}{\partial t} + I_K + I_{Na} + I_L,$$

we have $$(a/2R_i) \frac{\partial^2 v_m}{\partial x^2} = C_m \frac{\partial v_m}{\partial t} + I_K + I_{Na} + I_L. \tag{7}$$

At this point most neurophysiologists reason that because the propagation speed of the action potential is almost constant, then: (Jack et al. 1975).

$$V(x,t) = f(x-t), \tag{8}$$

where q is the propagation speed. Therefore the partial derivatives of V are related to each other as follows:

$$\frac{\partial v_m}{\partial x} = -\frac{1}{\theta} \frac{\partial v_m}{\partial t} \text{ and} \tag{9}$$

$$\frac{\partial^2 v_m}{\partial x^2} = \frac{1}{\theta^2} \frac{\partial^2 v_m}{\partial t^2}. \tag{10}$$

Equation (10) discloses that of the propagation of a wave. Thus using the constancy of the propagation speed, Hodjkin and Hoxley inferred that the propagation of the action potential must be wavelike. No further explanation appears in the neurophysiology literature (Jhonston et al. 1997; Jack et al. 1975; Aidely 1978).

Using Eq. (10) we can rewrite Eq. (7) as $$\frac{a}{2R_i \theta^2} \frac{\partial^2 v_m}{\partial t^2} = C_m \frac{\partial v_m}{\partial t} + I_K + I_{Na} + I_L. \tag{11}$$

Reference 5 expresses ". . . the major disadvantage [of Eq. (11)] is that the value of is required in advance in order to solve this equation. . . . By a process of successive approximation the correct value of may be obtained to an arbitrary degree of accuracy."

Hodjkin and Hoxley's prediction was quite close to the experimental value (Jack et al. 1975).

Their estimated value of the propagation speed of the action potential is 18.8 m/s (Jhonston et al., 1997).

One major point not considered by any theory of the propagation of action potential is that the path of the ions through the ion channels may not be a straight line (Jhonston et al., 1997; Jack et al.; 1975; Aidely, 1978; Hodgjkin et al., 1952).

Figure 6:
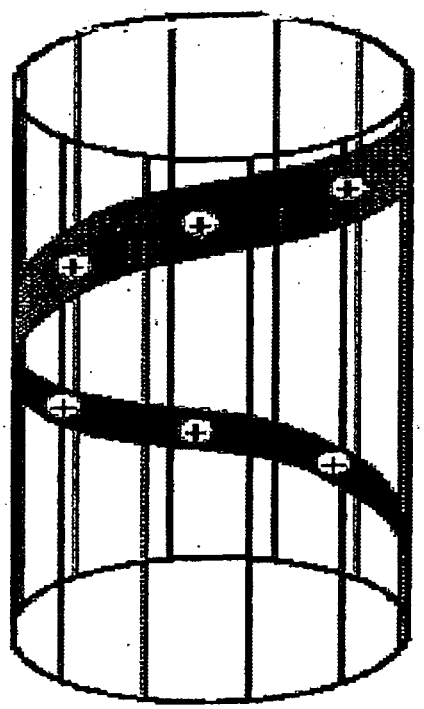
FIG. 6 is a helix model of a sub-unit of the brain Na+ channel.

FIG. 6 shows the sliding helix (the S4 subunit) model of voltage-gated Na$^+$ channel (Jhonston et al., 1997).

This model propounds that the S4 helices respond to membrane depolarization by rotating 60 while moving outward by about 5A. Since the positively charged amino acid residues in S4 are separated by about 5A from one another, the above rotation produces charge displacement analogous to moving one charge across the whole membrane (Jhonston et al., 1997).

Actually, the path of the ions themselves is, perhaps, helical; as shown in the studies of ionophores (Wayne M. Becker, The World of the Cell, Benjamin/Commings, Menlo Park, Calif. 1986). Ionophores are molecules which exceedingly expand the membrane's permeability to cations such as K$^+$, Na$^+$, and H$^+$.

Some ionophores are channel formers and some are ion carries. Gramicidin is an example of channel forming ionophores. This antibiotic is a polypeptide with 15 amino acids. When inserted into a membrane, the gramicidin polypeptide assumes a helical shape. Accordingly, the actual path of the ions through these molecules is helical (Becker, 1986).

This changes the membrane circuit substantially since inductors representing the helical movement of the ions must be added.

Figure 7:
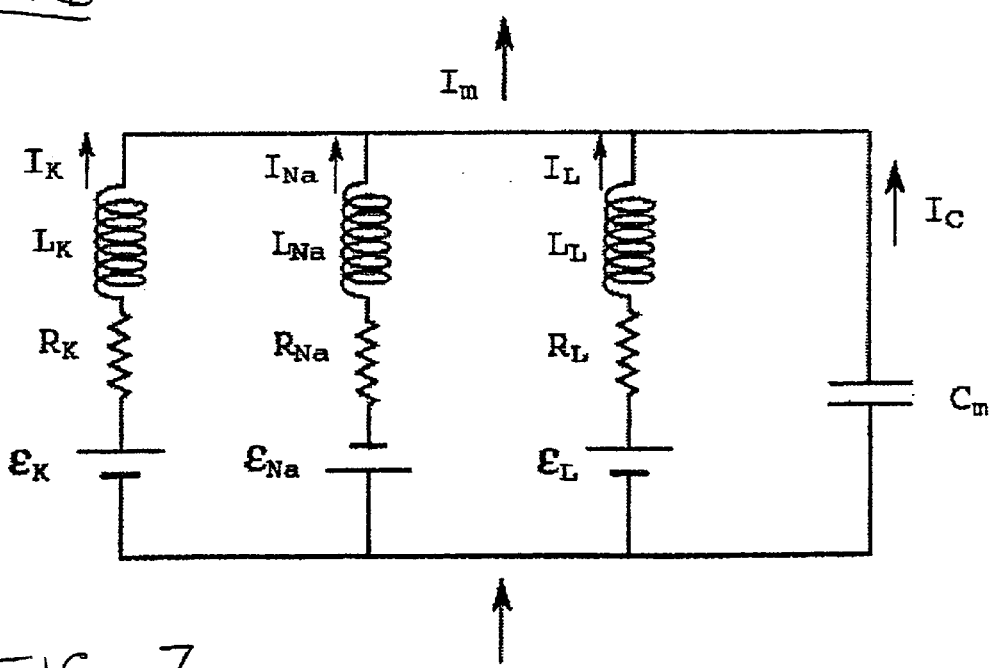
FIG. 7 is a model of a corrected parallel circuit, indicative of the spiral path of the ions in their appropriate channels.

FIG. 7 shows the "corrected" electric circuit of the membrane. Here, I have added the inductors as an indication of the fact that the motion of ions through their channels (as well as that of the channel gates) is spiral. Here, $I_K$, $I_{Na}$, and $I_L$, $R_K$, $R_{Na}$, and $R_L$, $L_K$, $L_{Na}$, and $L_L$, $_{K, Na}$, and $_L$ represent the electric current, resistance, inductance, and resting potentials of $K^+$, $N^+$, and other ions, respectively.

The capacitor behavior of the membrane is symbolized by $C_m$. For that part of the neuron fiber affected by the action potential, $V_0$, the initial membrane potential is the same as $V_m$ only at $t=0$, while the initial current is zero. Using Kirchhoff's current and voltage laws (John D. Cotnell and Kenneth W. Johnson, Physics, Third Edition, John Wiley&Sons Inc. New York 1995) for the three loops, each containing the capacitor and one of the ion group resistance, inductance, and resting potential, we have:

$$\epsilon_K - R_K I_K - L_K \frac{dI_K}{dt} + \frac{Q_m}{C_m} = 0, \quad (12)$$

$$-\epsilon_{Na} - R_{Na} I_{Na} - L_{Na} \frac{dI_{Na}}{dt} + \frac{Q_m}{C_m} = 0, \quad (13)$$

$$\epsilon_L - R_L I_L - L_L \frac{dI_L}{dt} + \frac{Q_m}{C_m} = 0. \quad (14)$$

Dividing each equation by its pertinent L, adding them, defining:

$$\frac{1}{L} \frac{1}{L_L} + \frac{1}{L_{Na}} + \frac{1}{L_L}, \quad (15)$$

$$\frac{\epsilon_\lambda}{L} \frac{\epsilon_K}{L_K} - \frac{\epsilon_{Na}}{L_{Na}} + \frac{\epsilon_L}{L_L}, \quad (16)$$

and assuming the ratio of resistance, R, to inductance, L, to be the same for all channels and defining g as:

$$\frac{R}{L} \frac{R_K}{L_K} = \frac{R_{Na}}{L_{Na}} = \frac{R_L}{L_L}, \quad (17)$$

the following equation is concluded:

$$-\frac{\epsilon_\lambda}{L} - \gamma(I_K + I_{Na} + I_L) - \frac{d}{dt}(I_K + I_{Na} + I_L) + \frac{Q_m}{LC} = 0. \quad (18)$$

Using $I_K + I_{Na} + I_L = I_m - I_C$, we have:

$$\frac{\epsilon_\lambda}{L} - \gamma(I_m - I_C) \frac{d}{dt}(I_m - I_C) + \frac{Q_m}{LC} = 0. \quad (19)$$

Equation (19) is exactly the same as that for a circuit embodying a battery of potential, $\epsilon_\lambda$, an inductor L, a resistor R, and a capacitor C, connected in series.

Figure 8:
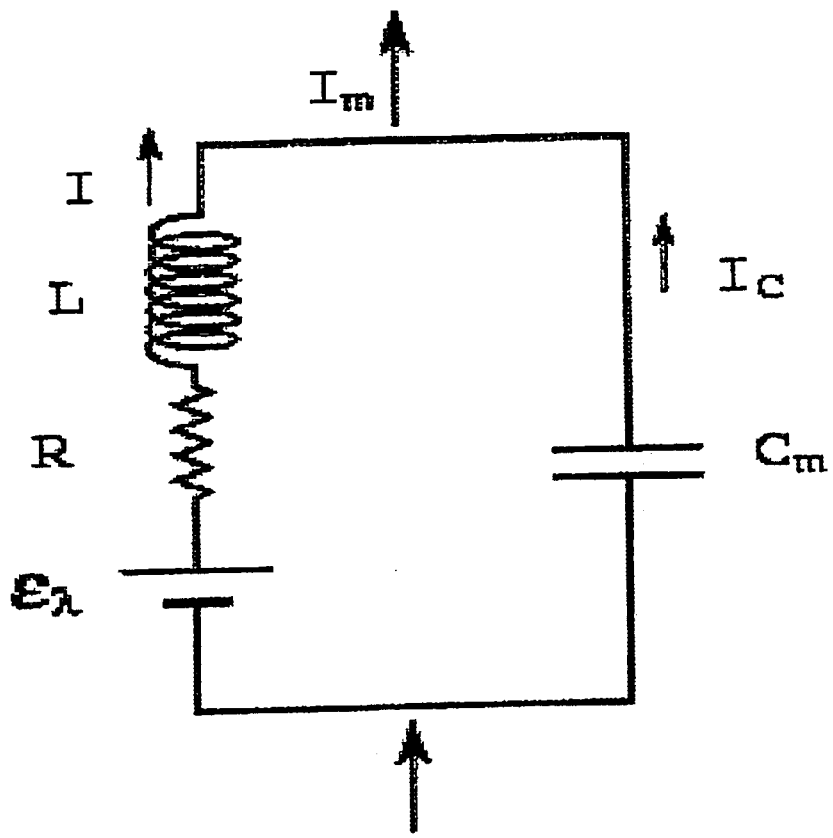
FIG. 8 is an equivalent circuit for the parallel circuit.

Therefore, the membrane circuit of three ion channels is equivalent to a circuit of one ion channel of FIG. 8. Taking the time derivative of Eq. (19), while assuming the terms g and L and $$\frac{\epsilon_\lambda}{L}$$

to be constants (the linear case), we have:

$$-\frac{d}{dt}(I_m - I_C) - \frac{d^2}{dt^2}(I_m - I_C) + \frac{I_m}{LC_m} = 0, \quad (20)$$

which can be rearranged to yield:

$$\frac{d^2 I_m}{dt^2} + \frac{dI_m}{dt} - \frac{d^2 I_c}{dt^2} - \frac{dI_c}{dt} - \frac{I_c}{LC_m} = 0. \quad (21)$$

Since Eq. (21) must hold true, one way to solve it is to assume the first two terms (i.e. the terms which contain $I_m$) to be identically equal to zero. Then we have:

$$\frac{d^2 I_m}{dt^2} + \frac{dI_m}{dt} = 0, \text{ and} \quad (22)$$

$$\frac{d^2 I_c}{dt^2} - \frac{dI_c}{dt} - \frac{I_c}{LC_m} = 0. \quad (23)$$

Solving Eq. (22), we find:

$$I_m = I_0 e^{-\gamma t}, \quad (24)$$

where $I_m(t=0)=I_0$, while noting that the initial potential, $V_0$, produces an initial $I_m$ and that $I_m(t)=0$. After $t=^{-1}$ sec., $I_m=0.37 I_0$ and after $t=4^{-1}$ sec., $I_m=0.02 I_0$.

Moving ahead to solve Eq. (23), we take $I_C = Ae^{xt}$, which results in $$x^2 + x + \frac{1}{LC_m} = 0. \quad (25)$$

Solving this quadratic equation for x, we have $$x = \frac{-1}{2} \pm \frac{1}{2}\left[\gamma^2 - \frac{4}{LC_m}\right]^{1/2}. \quad (26)$$

For $$\gamma \frac{4}{LC_m},$$

we acquire x<0. Thus, $I_C$ will be equal to the exponential of a negative number for all times. This means $I_C(t)=0$. On the other hand for $$\gamma < \frac{4}{LC_m}$$

we have:

$$I_C = Ae^{-t/2} e^{\pm it/2}, \quad (27)$$

where $$= \left[-\gamma^2 + \frac{4}{LC_m}\right]^{1/2} > 0,$$

and $i=\sqrt{-1}$.

Equation (27) indicates that in general, the current across the two sides of the membrane, or the equivalent inductor of the ion channels L, is a damped oscillatory function of time. Obviously the damping time depends on the ratio of resistance to the self inductance of the ion channels. Since the real part of the function in Eq. (27) is our answer to $I_C$, then we have:

$$I_C = A e^{-t/2} \sin\left(\frac{\Delta}{2}t\right). \tag{28}$$

Considering that $$V_m(t) = C_m \int_0^t I_C(t) \, dt,$$

and that $V_m(0) = V_0$, we can demonstrate:

$$V_m(t) = V_0 e^{-t/2}\left[\cos\left(\frac{\Delta}{2}t\right) + \frac{\gamma}{\Delta}\sin\left(\frac{\Delta}{2}t\right)\right] \text{ and} \tag{29}$$

$$A = -C_m V_0 \frac{\Delta}{2}\left(1 + \frac{\gamma^2}{\Delta^2}\right), \text{ which results} \tag{30}$$

in:

$$I_C = C_m V_0 \frac{\Delta}{2}\left(1 + \frac{\gamma^2}{\Delta^2}\right) e^{-t/2} \sin\left(\frac{\Delta}{2}t\right). \tag{31}$$

Hence the current of the inductor, $I_I = I_K + I_{Na} + I_L = I_m - I_C$, is $$I_1(t) = I_0 e^{-\gamma t} - C_m V_0 \frac{\Delta}{2}\left(1 + \frac{\gamma^2}{\Delta^2}\right) e^{-t/2} \sin\left(\frac{\Delta}{2}t\right) \tag{32}$$

Equation (32) shows that the ionic current of the equivalent channel, due to the action potential, is a damping oscillatory function of time. However according to Faraday's law of induction, (Cotnell et al. 1995), before damping, this time varying current induces currents in neighboring ion channels (inductors), yielding in the inductive propagation of the potential.

An intriguing aspect of this model emerges when we investigate the propagation of the capacitative, or the inductive, current/potential along the nerve fiber. Since all of the circuits resemble each other, they all can be replaced with their equivalent circuits containing only one inductor L.

Essentially according to Faraday's law of induction, (Cotnell et al. 1995), the variable magnetic field of the first inductor induces an electromotive force, EMF, across its neighboring inductor, $L_2 =$. In general the induced EMF, by any inductor, $L_1$, on another inductor, $L_2$, is given by:

$$EMF = -M_{12}\frac{dI_1}{dt} \tag{33}$$

where $I_1 = I_1(t)$ in the present case. The coefficient $M_{12}$ is the mutual inductance and in general is given by (Cotnell et al. 1995):

$$M_{12} = \sqrt{L_1 L_2}. \tag{34}$$

In the present case, since $L = L = L$, we have:

$$M_{12} = L. \tag{35}$$

Thus, the induced $EMF_2$ in the inductor adjacent to the one acted on by the action potential, $V_0$, is:

$$EMF = -L\frac{dI_1}{dt}. \tag{36}$$

This $EMF_2$ produces a current in the second inductor which can be found through:

$$-L_2 \frac{dI_2}{dt} = -L\frac{dI_2}{dt} = EMF. \tag{37}$$

From Eqs. (36) and (37) it is clear that $I_2 = I_1$.

Consequently, the induced current in the second inductor adjacent to the first one, is exactly the same as the current of the first inductor—same damping oscillatory functions of time. Again, before complete damping, the secondary current induces a tertiary current in its neighboring inductor.

Similarly, the tertiary and all of the other subsequent induced currents are precisely the same as $I_I(t)$ of Eq. (32). In an identical manner, the induction of EMF continues all the way across the nerve fiber. Consequently, the effect of the action potential is communicated among the channels of the membrane resulting in the longitudinal motion of the potential.

Due to the electrical resistivity of the channels, however, in each circuit part of the energy of the induced EM—the induced potential—converts to heat resulting in a gradual reduction in the magnitude of the longitudinally moving potential.

An important point about my suggested neural chip circuits of the membrane ion channels is the fact that each of these, capacitor-inductor circuits performs as a radio receiver and transmitter. Thus, the joined performance of these circuits is also that of a radio transmitter and receiver. I will elaborate on this later.

An offshoot of this model is that when the electrical resistance of every ion channel is zero, i.e., the channels are superconducting. This insinuates=0 and the circuit reduces to parallel inductors which are in parallel with the capacitor of the membrane. Equations (12), (13) and (14), which were found using Kirchhoff's laws, reduce to the following equations:

$$\kappa - L_K \frac{dI_K}{dt} + \frac{Q_m}{C_m} = 0, \tag{38}$$

$$-_{Na} - L_{Na}\frac{dI_{Na}}{dt} + \frac{Q_m}{C_m} = 0, \tag{39}$$

$$_L - L_L \frac{dI_L}{dt} + \frac{Q_m}{C_m} = 0. \tag{40}$$

Again, dividing Eq. (38), (39), and (40) by $L_K$, $L_{Na}$, and $L_L$ respectively, and then adding them together we have:

$$\frac{\varepsilon_\lambda}{L} - \frac{d}{dt}(I_K + I_{Na} + I_L) + \frac{1}{L}\frac{Q_m}{C_m}, \tag{41}$$

where again $$\frac{1}{L}\frac{1}{L_K} + \frac{1}{L_N} + \frac{1}{L_L}, \text{ and } \frac{\varepsilon_\lambda}{L}\frac{\varepsilon_K}{L_K} - \frac{\varepsilon_{Na}}{L_{Na}} + \frac{\varepsilon_L}{L_L}.$$

Figure 9:
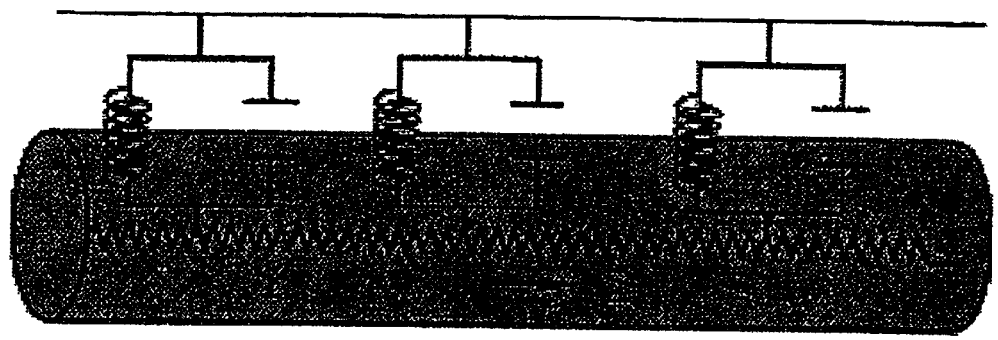
FIG. 9 is a schematic view of corrected parallel circuits, taken along the axon.
Figure 10:
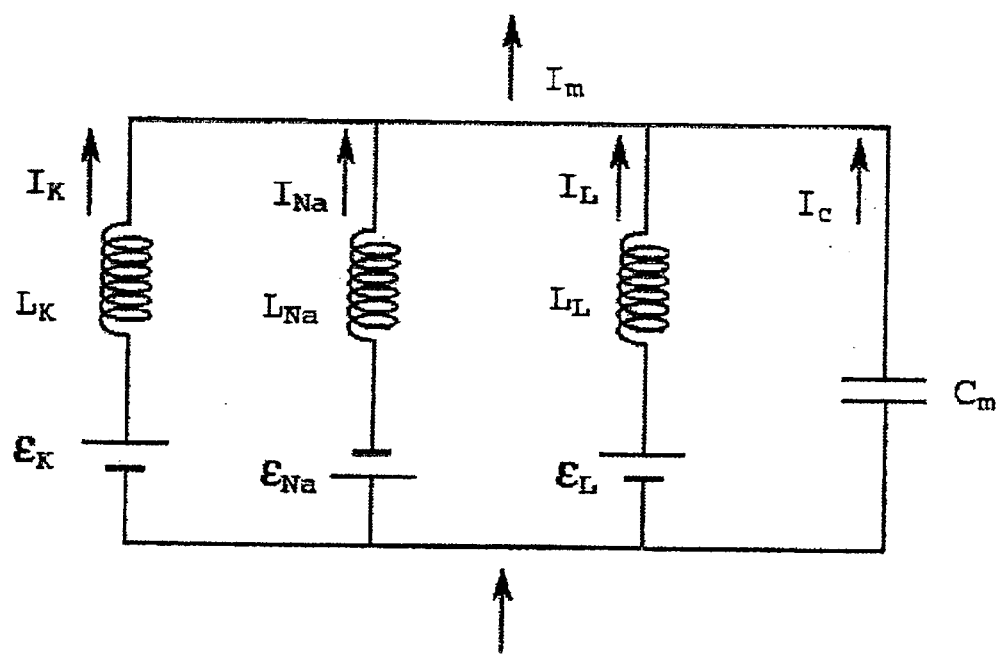
FIG. 10 is a schematic view of a corrected parallel circuit for superconducting channels, where the resistance is equal to zero.

Equation (41) is for a circuit containing one inductor of self inductance L, a battery of potential $\varepsilon_\lambda$, and a capacitor C (FIG. 9). Therefore, we can conceive of the capacitor of membrane C, embodying single ion channel L, with a resting potential $\epsilon_\lambda$. The substituted form of Eq. (41) is:

$$\frac{\epsilon_\lambda}{L}\frac{dl_\lambda}{dt} + \frac{1}{L}\frac{Q_m}{C_m} = 0, \quad (42)$$

with $I_f(=I_K+I_{Na}+I=I_mI_C)$ the equivalent current through the inductor L. Taking the time derivative of Eq. (42) and assuming L to be constant, we have:

$$\frac{d^2 I_c}{dt^2} + \frac{I_c}{LC_m}\frac{d^2 I_m}{dt^2} = 0. \quad (43)$$

One solution to the above equation is when the terms including $I_C$ are equal to zero, concurring to which we have:

$$\frac{d^2 I_m}{dt^2} = 0, \text{ and} \quad (44)$$

$$\frac{d^2 I_c}{dt^2} + \frac{I_c}{LC_m} = 0. \quad (45)$$

From Eq. (44) we get $I_m = At+B$. Nevertheless, both A and B must be identically equal to zero, because otherwise the current becomes infinitely large or persists forever respectively thus $I_m = 0$. The solution to Eq. (45) is:

$$I_C = V_0 wC \sin \omega t, \quad (46)$$

where again $$w = \sqrt{\frac{1}{LC_m}}.$$

The coefficient $V_0 wC$ in Eq. (46) is found regarding the initial condition $V_m(0)=v$. Also with $I_m=0$, we have:

$$I_f = I_C = V_0 wC \sin \omega t. \quad (47)$$

Equation (47) asserts that the current in the inductor, as well as that in the capacitor, is an oscillatory function of time, persisting forever while its magnitude never surpasses $V_0 wC$. It can be shown that the potential across the inductor and the capacitor is:

$$V_f = V_C = V_0 \cos \omega t, \quad (48)$$

which also is an enduring oscillatory function of time.

All of the induced EMF's would actually be in phase had the position of all of the ion channel inductors been the same. Nevertheless, in one dimensional cases, the inductors are positioned alongside one another, necessitating a traveling of the electromagnetic field from one inductor to the other along the x axis.

Using Maxwell's equations, it can easily be shown that the spatial-temporal variation of the magnetic field itself is wavelike. The wave equation for the propagation of the electromagnetic field in three dimensional space with permittivity e and permeability m is:

$$2\vec{\rightarrow} = \frac{\mu\epsilon}{c^2}\frac{\partial^2 \vec{B}}{\partial t^2} \quad (49)$$

In one dimension this equation reduces to:

$$\frac{\partial^2 \vec{B}}{\partial x^2} = \frac{\mu\epsilon}{c^2}\frac{\partial^2 \vec{B}}{\partial t^2}, \quad (50)$$

with $$\frac{c^2}{\mu\epsilon} = v^2.$$

The general solution to Eq. (50) is:

$$= \vec{B} \sin(\omega t + kx), \quad (51)$$

where kv=. From Eq. (51) it is clear that in its movement from one inductor to the other the magnetic field gains a phase $\Delta\phi = kx$.

According to Eq. (51), the propagation speed of the action potential in the nerve fiber is $$v = \frac{c}{\sqrt{\mu\epsilon}}.$$

This is unquestionably much greater than the speed with which the information from different parts of the body reaches the brain (v 20 m/s) (Jhonston et al. 1997) I believe the propagation of the action potential is slowed down at the synapses by the process of presynaptic release of neurotransmitters, their motion across the synaptic cleft, and the postsynaptic stimulation of the dendrites. Therefore, the observed speed of v 20 m/s is the collective average of the longitudinal speed of the action potential along the nerve fibers.

The frequency of the neurotransmitters' release is also the same as that of the action potential in the ion channel inductors. Hence, the postsynaptic fibers also oscillate with the same frequency as that of the presynaptic fiber. This indicates that all nerve fibers between the point of stimulation and the data processing center in the brain oscillate with the same frequency.

As mentioned, the single circuit (including the membrane capacitor, the ion channel, inductors and resistors) acts as a radio receiver and transmitter. Consequently, the nerve fibers, the neurons, and the whole CNS are radio receivers and transmitters. Thus, numerous potential modeling applications result.

Any neuron model is used in a network called Neural Network, (NN) or Artificial Intelligence (AI). The AI scientists attempt to understand and model the information processing capabilities of typical human minds. They also try to understand the general principles for explaining and modeling intelligent systems, whether human, animal, or artificial. A Neural Network is a processing device, either an algorithm, or actual hardware, whose design was motivated by the design and functioning of human brain and its components.

Obviously the present, more complete, model of the neuron will deeply affect the networks, networking, and artificial intelligence. Our approach first will be to fabricate one model-neuron (according to the present model) and investigate its functional similarity to that of the real neuron. Then we will put our model-neuron in a network and subsequently draw desired functions out of it much similar to that being practiced on the present models of the neuron. The introduction of an inductance in the circuit of the customary model neuron is definitely a revolutionary advancement. This completes the conversion of the model-neuron circuit to a radio transmitter-receiver.

A network of such transmitter receivers can operate at a very large frequency band. Therefore, this network can be made to achieve better (than the common networks) similarity to the human data collecting and decision making. The transmission-reception power of this (radio) network indicates its great ability to communicate with other networks without any physical contact, and also receive the data whose transmitter is not necessarily visible.

This communication of the networks indeed includes the human being. In other words, the transmission-reception ability of my suggested neural network makes its communication with human being a commonplace function. The reception ability of such a neural network can be extended very largely and utilized fully to exhibit receptions beyond what human being has demonstrated.

Lastly, a better understanding of the human neural function will pave our way to cure the present neuropsychological and other neuron related disorders.

There have been some experiments in designing some forms of hardware to support AI, e.g., hardware for playing chess, vision, implementing AI languages like lisp or prolog, neural computation, robot, and robot components. In future there may be AI models or applications using entirely new forms of computers, e.g., quantum and/or DNA computers. No matter in what way these hardwares are designed and manipulated, since their basic structural unit, i.e., their single neuron model has an "imperfect" structure, their network demonstrates limited functionality as well.

As for simulating human consciousness and emotion, that is still in the realm of science fiction. Consciousness is still one of the world's great mysteries. The present (new) model proposed will certainly pave the way to actualize the real Artificial Intelligence.

As previously discussed, human consciousness is like the Radio-TV waves and his/her Central Nervous System is like the Radio-TV set. Therefore, a neural network built of my model neurons will detect the "waves" of consciousness, thus better achieving the conscious-emotional purpose.

Present day artificial NNs may be useful for partial modeling of some aspects or prerequisites of consciousness, such as perception and cognition; but so far they provide no insight into the "hard problem" of what consciousness is. On the other hand, we will extensively investigate the nature of human consciousness using the suggested model-neuron.

Basically, most present day applications of neural network fall into the following five categories:

Prediction
Classification
Data Association
Data Conceptualization
Data Filtering Neural networks have also been applied to convert text to speech. Another field of research for the application of neural network is character, handwriting and pattern recognition.

Most AI researchers believe that new fundamental ideas are required, and therefore it cannot be predicted when human level intelligence will be achieved. Again I believe the investigation of my model-neuron will conceivably demonstrate the fundamentality which has been desired for a long time.

Based on the above facts, it is obvious that a new model of the neuron structure will tremendously influence the human advancement toward new technologies.

The membrane current is perpendicular to the membrane itself and the internal current is along the axis of the cylindrical nerve fiber. Therefore, $r_m$ is the resistance in the perpendicular direction to the membrane or to the axis. $r_m$, $r_i$, $c_m$, and $i_m$ are the linear parameters; i.e. those for 1 cm along the fiber. On the other hand $R_m$, $R_i$, $C_m$, and $I_m$ are parameters for 1 cm$^2$ area of their related surfaces. The parameters $R_m$, $C_m$, and $I_m$ are for a strip of 1 cm$^2$ on the surface of the cylinder, while $R_i$ is for 1 cm$^2$ of the cross sectional area of the cylinder.

In order to find the equations converting one set of the parameters to the other, we approach as follows: Since the circumference of the outer layer of the cylinder is 2 a, with $$\frac{1}{2\pi a}$$

being the radius, in order to stack n of these circles to get an area of 1 cm$^2$, n has to be $$\frac{1}{2\pi a}.$$

For the case of membrane resistance, since the n resistors $r_m$ have to be put together in parallel, then the total resistance $R_m$ is:

$$R_m = \frac{r_m}{n} = 2\pi a r. \tag{I1}$$

For the case of membrane capacitance, the n capacitors $c_m$ are put together in parallel to yield the net capacitance $C_m$. Therefore:

$$C_m = nc_m = \frac{c_m}{2\pi a}. \tag{I2}$$

In the case of the membrane current, we have to put n parallel $i_m$'s to get $I_m$. Thus:

$$I_m = ni_m = \frac{i_m}{2\pi a}. \tag{I3}$$

For the case of the internal resistance, since the current passes through the whole surface of area $\pi a^2$ in order to get an area of 1 cm$^2$, N of these disks have to be stacked beside each other. Hence:

$$N = \frac{1}{\pi a^2}. \tag{I4}$$

Since these N disks are in series, then:

$$R_i = Nr_i = \frac{r_i}{\pi a^2}. \tag{I5}$$

Finally, for the internal current, since there are $N = \pi a^2$ of 1 cm$^2$ areas in the surface of one disk, then the current passing through one disk is:

$$I_d = NI_i = \pi a^2 I_i, \tag{16}$$

but no matter how many of these disks are stacked together, since the disks are in series, the net current is still the same. Thus:

$$i_i = \pi a^2 I_i. \quad (17)$$

The new neuron chip disclosed herein may be utilized in artificial neural network technology. Other uses include a speech processor for the hearing impaired, capable of receiving the sound and recognizing the component of speech such as phonemes. Further it is capable of recognizing words and sentences. Finally, the words and sentences may be displayed upon a suitable screen. FIG. 11 is a block diagram showing a preferred embodiment of the speech processor.

As shown in FIG. 11, an input voice 20 is imputed into a preprocessor 30. Data from the preprocessor 30 then goes to a network of neurons, such as a speech processor 40 IC. A database 50 of words, phrases, etc., in one or more languages, communicates with the speech processor 40 IC. Output from the speech processor 40 IC then goes to a display monitor 60 to print the input voice on a suitable display monitor 60. Alternately, the display monitor 60 may be a printer, or other character recognition device (not shown).

Existing speech processors do not perform in all situations. There is little or no chance for the hearing impaired to communicate possible errors. The new speech processor disclosed herein, will greatly improve the performance of speech processors.

Although the invention has been described herein by way of several exemplary embodiments, variations may be made without departing from the spirit and scope of the invention.

What is claimed is:

1. A neuron network modeling apparatus for the propagation of current potential along a selected nerve fiber, which comprises: a neuron, two membranes, and membrane ion channels, which together act as a resistor-capacitor-inductor circuit to enhance the reception-transmission power of the neuron network in a neuron computer chip.

2. Neuron network modeling apparatus of claim 1, wherein membrane ion channels in the neuron network modeling apparatus act as inductive elements that conduct the ions on spiral paths.

3. The neuron network modeling apparatus of claim 1, wherein stimuli is used to increase the positive ion concentration of the outer cell membrane, in order to increase the magnitude of the potential depolarization of the neuron network modeling apparatus.

4. The neuron computer chip apparatus of claim 1, wherein all nerve fibers between the point of stimulation and the data processing center are set to oscillate at the same frequency within the neuron network modeling apparatus.

5. The neuron network modeling apparatus of claim 1, wherein the neuron network modeling apparatus communicates with other neuron networks within the neuron network modeling apparatus without requiring any physical contact there-between.

6. The neuron network modeling apparatus of claim 1, wherein a neuron computer chip converts speech to text.

7. The neuron network modeling apparatus of claim 1, wherein a membrane current is positioned perpendicular to a selected membrane, and the internal current is directed along the axis of a cylindrical nerve fiber located in the neuron network modeling apparatus.

8. The neuron network modeling apparatus of claim 1, wherein neuron behavior is delivered in terms of electrical properties pertaining to the propagation of resistive, capacitative and inductive current/potential along a nerve fiber within the neuron network modeling apparatus.

9. The neuron network modeling apparatus of claim 1, wherein the two membranes act as capacitors and the ion channels act as an inductor that conduct the ions on spiral paths in an electrical circuit, in a manner similar to a radio receiver and transmitter within the neuron network modeling apparatus.

10. A process of neuron network modeling for the propagation of current potential along a selected nerve fiber, which comprises: combining a neuron, two membranes, and at least one membrane ion channel, which together act as a resistor-capacitor-inductor circuit to enhance the reception-transmission power of the neuron network in a neuron computer chip.

11. The process of neuron network modeling of claim 10, wherein the membrane ion channels act as inductive elements that conduct the ions on spiral paths within the neuron network.

12. The process of neuron network modeling of claim 10, wherein stimuli is used to increase the positive ion concentration of the outer cell membrane, in order to increase the magnitude of the potential depolarization within the neuron network.

13. The process of neuron network modeling of claim 10, wherein all nerve fibers between the point of stimulation and the data processing center are set to oscillate at the same frequency within the neuron network.

14. The process of neuron network modeling of claim 10, wherein a voice input is sent to a preprocessor, and a signal from the preprocessor then goes to a speech processor IC comprising a network of neurons, the speech processor IC in communication with a database of words and phrases in at least one language, and the speech processor IC sends a print relating to the voice input to a display monitor for converting speech to text.

15. The process of neuron network modeling of claim 10, wherein a membrane current is positioned perpendicular to a selected membrane, and the internal current is directed along the axis of the cylindrical nerve fiber within the neuron network.

16. The process of neuron network modeling of claim 10, wherein neuron behavior is delivered in terms of electrical properties pertaining to the propagation of resistive, capacitative and inductive current/potential along a nerve fiber within the neuron network.

17. The process of neuron network modeling of claim 10, wherein the two membranes act as capacitors and the ion channels act as an inductor having a spiral path in an electrical circuit, in a-manner similar to a radio receiver, a transmitter.

18. A method of neuron network modeling, which comprises:
   a) processing an input voice signal in a preprocessor;
   b) sending the signal from the preprocessor to a network of neurons forming a speech processor integrated circuit;
   c) accessing a database of words and phrases in at least one selected language with the speech processor; and
   d) and visually displaying a print of the input voice on a display monitor.

19. The method of claim 18, which comprises increasing the positive ion concentration of the outer cell membrane, thus increasing the magnitude of the potential depolarization in the network of neurons.

20. The method of claim 18, which comprises delivering neuron behavior in terms of electrical properties pertaining to the propagation of resistive, capacitative and inductive current/potential along a nerve fiber.

* * * * *